Dec. 6, 1960 A. J. SPENCER 2,963,686
DATA STORAGE APPARATUS
Filed Sept. 27, 1955
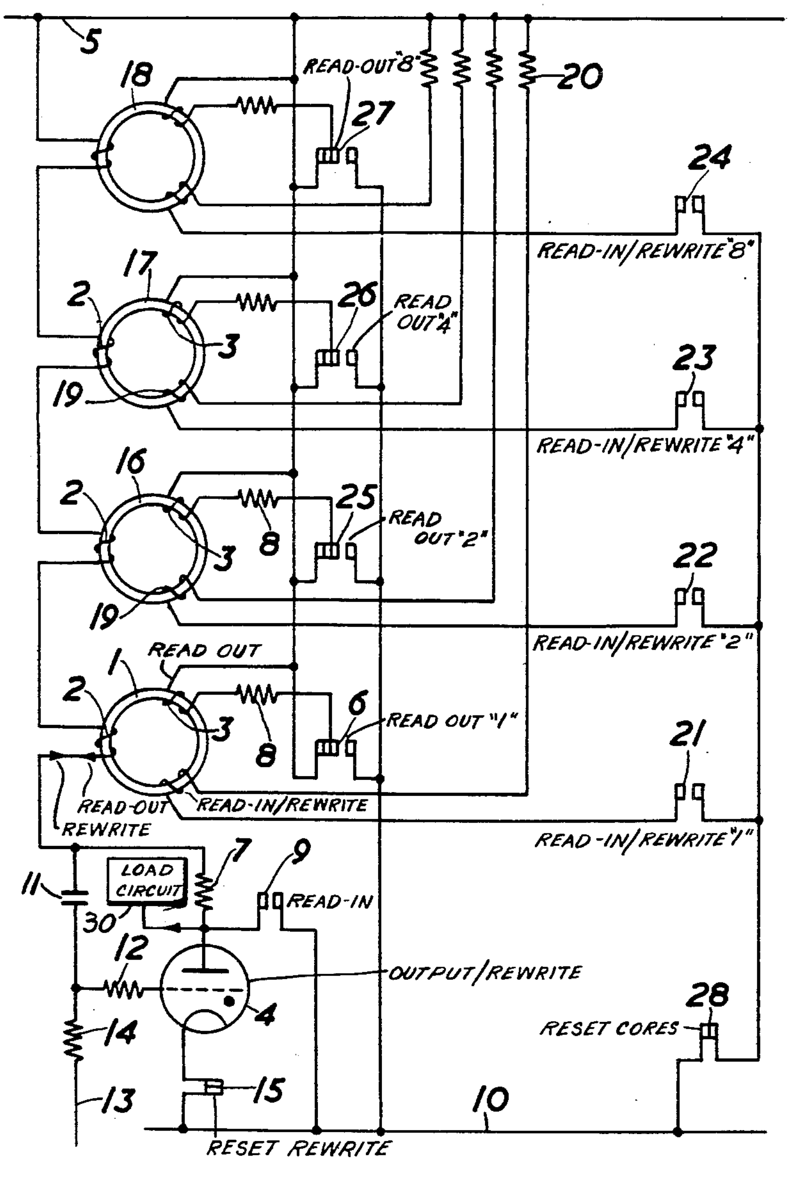
INVENTOR
ARTHUR JAMES SPENCER
BY Kane and Nydick
ATTORNEYS 2,963,686
Patented Dec. 6, 1960

2,963,686

DATA STORAGE APPARATUS

Arthur James Spencer, Stevenage, England, assignor to International Computers and Tabulators Limited, London, England Filed Sept. 27, 1955, Ser. No. 536,980

Claims priority, application Great Britain Mar. 11, 1955

18 Claims. (Cl. 340—174)

This invention relates to data storage devices employing magnetic cores.

The use of the hysteresis properties of certain magnetic materials for data storage is well known. A core of such material may be made to assume either of two states of magnetisation (which will be referred to hereinafter as P or N), by applying a suitable magnetic field, for example, by passing a current through a coil wound on the core. The P and N states may be assigned a desired data significance, such as that of a binary "1" and a "0" respectively.

To determine if a core is representing a binary "1," a magnetic field is applied to the core in a direction to set it to the N state. If the core was previously in the P state the reversal of the magnetisation of the core induces a pulse in an output coil wound on the core. Hence, in determining the setting of the core that setting is destroyed.

The object of the present invention is to provide means for automatically restoring the original setting of a magnetic storage core each time that setting is destroyed by reading out.

According to the invention data storage apparatus has two or more cores of magnetic material which has a substantially rectangular hysteresis characteristic, a first winding on each of the cores, a normally non-conducting valve, all of said first windings being in series with the anode-cathode circuit of the valve, means for switching each of the cores from a first to a second state of magnetisation, a second winding on each core, means for passing a current through each of the second windings to switch the related core from a first state of magnetisation to a second state of magnetisation, and means coupling the first windings to the grid of the valve to cause the valve to conduct when any of the cores are switched from the first to the second state, the currents flowing through said first and second winding being such that the magnetomotive force produced by a first and a second winding together, is sufficient to switch the related core from the second to the first state, whereas the magneto-motive force produced by either winding alone is insufficient to cause switching of the core. The valve may control switching of a single core, in which case the current flowing through the first winding alone produces sufficient magneto-motive force to switch the core from the second to the first state of magnetisation.

The invention will now be described, by way of example, with reference to the accompanying drawing, which shows an arrangement in which a single valve effects the resetting of four cores.

For the storage of decimal values, it is convenient to employ magnetic storage cores in groups of four. Each group of four cores can be used to store a single decimal digit in coded form. Any suitable four component code may be used, so that the four cores may represent the code components 1, 2, 4 and 8, for example, or 1, 2, 4, 5.

One such group of four cores is shown in the drawing, cores 1, 16, 17 and 18 representing the code components 1, 2, 4 and 8 respectively. Each core has three coils 2, 3 and 19 wound thereon. All the coils 2 are connected in series with each other, and with a resistor 7, between a positive supply line 5 and the anode of a gas triode 4.

The cathode of the triode 4 is connected through normally closed contacts 15 to a negative supply line 10. The anode of the triode may also be connected to the line 10, by closing normally open contacts 9. The grid of the triode 4 is connected through a resistor 12 and a capacitor 11 to the high voltage end of the resistor 7. The grid is also connected through the resistor 12 and a resistor 14 to a bias line 13, the voltage of which is such that the triode is normally held non-conducting.

Current may be made to flow through the coils 2 either by making the triode 4 conducting, or by closing the contacts 9. The magneto-motive force produced by current flowing in the coils 2, is such that it tends to switch the cores to the P state. However, the resistor 7 limits the current to such a value that the magneto-motive force is insufficient to effect switching of the cores. Preferably the magneto-motive force produced is approximately half that required to switch the core from the N to the P state.

One end of each of the coils 19 is connected through a separate resistor 20 to the supply line 5. The other ends of the coils 19 on the cores 1, 16, 17 and 18, are connected through contacts 21, 22, 23 and 24 respectively, and a common normally closed contact 28 to the line 10. If the contact 21 is closed, for example, the related coil 19 carries a current which produces a magneto-motive force tending to switch the core 1 from the N to the P state. The magneto-motive force produced is less than that necessary to effect switching of the core, and is preferably approximately half that value.

One end of each coil 3 is connected directly to the supply line 5. The other end of each of the windings 3 is connected through a resistor 8 to the centre of a transfer contact. The "on" side of each of the transfer contacts is connected to the supply line 5, and the "off" side of each of the contacts is connected to the line 10. The coils 3 on the cores 1, 16, 17 and 18 are connected to transfer contacts 6, 25, 26 and 27 respectively. Thus the two ends of the winding 3 are normally connected together through the related transfer contact and resistor 8. This connection is necessary when several groups of cores are used together, when interconnections between certain of the windings may occur. This may happen, for example, if it is desired to read out simultaneously all the cores, of a number of groups, which represent the "1" code component. The connection through the "on" side of the transfer contact then aids in preventing unwanted interaction between the cores of the different groups.

In order to read data on to a core, that is to set the core to the P stage, the contact 9 is closed together with an appropriate one of the contacts 21, 22, 23 and 24. For example, suppose the contact 22 is closed, then the core 16 will be subject to magneto-motive forces produced by both coils 2 and 19. The total magneto-motive force is then sufficient to switch the core 16 to the P state.

In order to read data out from the core 16, the transfer contact 25 is shifted. This allows sufficient current to flow through the coil 3 to produce a magneto-motive force which switches the core 16 from the P to the N state. The reversal of magnetisation of the core 16 induces a voltage in the related coil 2. This voltage is fed to the grid of the triode 4 via the capacitor 11 and the resistor 12, and is of sufficient amplitude and duration to cause the triode to conduct.

If the core 16 is already in the N state when the coil 3 is energised, the change of magnetisation is much less, since the core is already near to magnetic saturation. This results in a very short pulse being induced in the coil 2. This pulse is too short compared with the ionisation time of the triode 4 to cause it to fire. This short pulse may be further discriminated against by feeding the pulses to the grid of the valve through an integrating circuit. For example, a capacitor may be connected directly between the grid and the line 10, to form an integrating circuit with the resistor 12.

The fact that the triode 4 conducts provides an indication that the core which has been pulsed was set to the P state. A load circuit 30 responsive to negative voltage changes of substantial duration may be connected to the anode of the triode.

Preferably the contact 25 is shifted only momentarily, and the contact 22 is closed immediately afterwards. Current is flowing in all the coils 2 with the triode 4 conducting, but the core 16 is the only one for which the coil 19 is also energised. Hence, the core 16 is reset to the P state, and the remaining cores are unaffected. The contact 22 may now be opened, and the contact 15 momentarily opened and then re-closed, leaving the store ready for the reading out of another core.

The cores must be read out and reset one at a time, since the single triode is associated with all four cores. Preferably, the cores are read out sequentially in the order 1, 16, 17 and 18. The necessary sequencing of the contacts 6, 25, 26, 27, 21, 22, 23, 24 and 15 is conveniently obtained by operating the contacts by cams mounted on a shaft which is rotated when the store is to be read out. Alternatively, known relay circuits may be employed in which a chain of relays are operated in sequence.

If it is desired to ensure that a particular core is in state N, the coil 3 is energised, but the corresponding coil 19 is not energised. All the cores may be set to state N during a read out operation by opening the contacts 28, to break the circuit to all the coils 19. The cores may also be set to state N by opening the contacts 15, and then shifting the contacts 6, 25, 26 and 27. This prevents firing of the triode, so that the coils 2 are not energised. This latter method has the disadvantage that a separate cycle of operation in addition to the read out operation is necessary.

It will be appreciated that a core will be reset as long as the coil 19 is energised before the triode is extinguished, so that the timing of the contacts 21, 22, 23 and 24 is not critical. The coil 19 may also be energised before, or concurrently with, the energisation of the coil 3, provided that the current in the coil 3 is increased to offset the effect of the opposing magneto-motive force generated by the coil 19. If the triode 4 has been fired, the core will be reset as soon as current ceases in the coil 3.

It may be necessary to provide for simultaneous reading out and resetting of all storage positions in some applications of magnetic core storage devices. It has already been explained that this cannot be done with one gas triode to several cores. Hence it is necessary to provide one triode for each core. However, some simplification can be effected in the individual circuits.

Each triode is now associated with a single core, so that selection of the core to be reset does not arise. Each core has a first winding connected to a triode in a similar manner to one of the windings 2. Each core also has a second winding, corresponding to one of the windings 3. There is no winding corresponding to the winding 19. The value of the resistor 7, and/or the number of turns on the first winding, is modified so that this winding alone produces sufficient magneto-motive force to switch the core from the N to the P state. In other respects the mode of operation is similar to that already described.

It is convenient to use a gas triode for resetting the cores because once it has been fired it continues to conduct and the duration of the current in the windings 2 is independent of the duration of the firing pulse. The disadvantages are that means must be provided for extinguishing it and that the de-ionisation time may be comparable with the time taken for reading out and resetting. The disadvantages may be overcome by replacing the gas triode by a hard valve, which is normally biased below cut-off and is made to conduct when a core is switched from the P to the N state. In order to discriminate against the short pulse produced when the core is switched in the other direction and to render the conduction period less dependent on the duration of the operating pulse, the pulses are applied to the grid through an integrating or pulse lengthening circuit. The pulse lengthening circuit may be of the known kind in which the pulse is applied, through a diode, to charge a capacitor.

I claim:

1. Data storage apparatus comprising at least two cores of magnetic material which has a substantially rectangular hysteresis characteristic, a first winding on each of said cores, a valve having a control electrode, all of said first windings being operatively connected in series with the anode-cathode circuit of said valve, a second winding in each of said cores, means for switching any of said cores from a first to a second state of magnetisation, means for selectively passing a current through any one of said second windings in a direction tending to switch the core from said second to said first state, means responsive to switching of any of said cores from said first to said second state to generate a signal, means coupling said signal generating means to said control electrode to apply said signal to said control electrode to cause said valve to conduct and to pass a current through said first windings in a direction tending to switch said cores from said second to said first state, alternative means for passing a current through said first windings in a direction tending to switch said cores from said second to said first state, the combined flux produced by the currents flowing through said first and second windings of a core being sufficient to switch that core from second to said first state, and the flux produced by the current flowing through one only of said windings being insufficient to cause switching of a core, and an output circuit responsive to the conduction current of said valve.

2. Data storage apparatus comprising at least two cores of magnetic material which has a substantially rectangular hysteresis characteristic, a first winding on each of said cores, a gas-filled valve having a control electrode, a resistor connecting in series the anode of said valve to all said first windings in series, a capacitor coupling the end of said resistor remote from said anode to said control electrode, a second winding on each of said cores, means for selectively passing a current through any one of said second windings, means for switching any one of said cores from a first to a second state of magnetisation, the voltage induced in the first winding when a core is switched from said first to said second state being applied through said capacitor to cause said valve to conduct and pass a current through said resistor and said first windings, alternative means for passing a current through said first windings in a direction tending to switch said cores from said second to said first state, the combined flux produced by the currents flowing through said first and second windings of a core being sufficient to switch that core from said second to said first state, and the flux produced by the current flowing through one only of said windings being insufficient to cause switching of a core, and an output circuit responsive to the conduction current of said valve.

3. Data storage apparatus comprising at least two cores of magnetic material which has a substantially rectangular hysteresis characteristic, a first winding on each of said cores, said windings being connected in series, read-in switch means for passing a current through said windings, in a direction tending to switch said core from a first to a second state of magnetisation, a second winding on each of said cores, second switch means for selectively passing a current through any one of said second windings in a direction tending to switch said core from said first to said second state, said read-in switch means and said second switch means being operative together to cause switching of a core, the current through one winding only of a core producing a flux insufficient to cause switching, means for switching any of said cores from said second to said first state, a valve having a control electrode, means coupling the anode-cathode circuit of said valve to said first windings in series, means responsive to switching of any of said cores from said first to said second state to generate a signal, means coupling said signal generating means to said control electrode to apply said signal to said control electrode to cause said valve to conduct and to pass a current through said first windings in a direction tending to switch said core to said second state, the conduction current of said valve producing a flux being insufficient to switch a core but the flux produced by the conduction current flowing through a first winding and by the current flowing through the second winding being sufficient to switch a core to said second state, whereby a core initially set to the second state and subsequently switched to said first state is reset to the second state by said second means during conduction of said valve, means for terminating conduction of said valve, and an output circuit responsive to the conduction current of said valve.

4. Data storage apparatus comprising at least two cores of magnetic material which has a substantially rectangular hysteresis characteristic, a first winding on each of said cores, said windings being connected in series, read-in switch means for passing a current through said windings in a direction tending to switch said core from a first to a second state of magnetisation, a second winding on each of said cores, second switch means for selectively passing a current through any one of said second windings in a direction tending to switch said core from said first to said second state, said read-in switch means and said second switch means being operative together to cause switching of a core, the current through one winding only of a core producing a flux insufficient to cause switching, a third winding on each of said cores, means for passing a current through said third windings of any of said cores to cause switching of that core from said second to said first state, a valve having a control electrode, means coupling the anode-cathode circuit of said valve to said first windings in series, means responsive to switching of any of said cores from said first to said second state to generate a signal, means coupling said signal generating means to said control electrode to apply said signal to said control electrode to cause said valve to conduct and to pass a current through said first windings in a direction tending to switch said core to said second state, the conduction current of said valve producing a flux insufficient to switch a core but the flux produced by the conduction current flowing through a first winding and by the current flowing through the second winding being sufficient to switch a core to said second state, whereby a core initially set to the second state and subsequently switched to said first state is reset to the second state by said second means during conduction of said valve, means for terminating conduction of said valve, and an output circuit responsive to the conduction current of said valve.

5. Data storage apparatus having at least two cores of magnetic material which has a substantially rectangular hysteresis characteristic, a first winding on each of the cores, a valve having a control electrode, all of said first windings being in series with the anode-cathode circuit of said valve, means for switching each of the cores from a first to a second state of magnetisation, a second winding on each core, means for selectively passing a current through any one of said second windings, means responsive to the switching of any said core from its first to its second state to generate a signal, means coupling said signal generating means to said control electrode to apply said signal thereto to render said valve conducting and thus to cause a current to flow in all said first windings, the combined flux produced by the currents flowing through said first and second windings being sufficient to switch the related core from the second to the first state, and the flux produced by the current in either winding alone being insufficient to cause switching of the core, and an output circuit responsive to the conduction current of said valve.

6. Data storage apparatus comprising a core of a magnetic material which has a substantially rectangular hysteresis chracteristic, the core having first and second stable states of magnetisation, a first winding on said core, a valve having a control electrode and an anode and a cathode defining an anode-cathode discharge path, a pair of direct current voltage supply terminals, means connecting the anode-cathode discharge path of said valve in series with said first winding across said supply terminals, means for maintaining the valve normally non-conducting, means for switching the core from its first to its second state, means responsive to switching of the core from its first to its second state to generate a signal and to apply said signal to said control electrode to render said valve conducting, the current flowing through said anode-cathode discharge path and the first winding in series when said valve conducts, having a magnitude at least equal to that which will cause the core to be switched from its second to its first state, and an output circuit responsive to current flowing through said anode-cathode discharge path.

7. Data storage apparatus comprising at least two cores of a magnetic material which has a substantially rectangular hysteresis characteristic, each core having first and second stable states of magnetisation, a first winding on each core, a valve having a control electrode and an anode and a cathode defining an anode-cathode discharge path, a pair of direct current voltage supply terminals, means connecting the anode-cathode discharge path of said valve in series with all said first windings across said supply terminals, means for maintaining the valve normally non-conducting, means separately associated with each core for switching it from its first to its second state, means responsive to the switching of any core from its first to its second state to generate a signal, means coupling said signal generating means to said control electrode to apply said signal thereto to render the valve conducting, the current which flows through said anode-cathode discharge path and said first windings in series, when the valve conducts, having a magnitude less than but equal to at least half of that which will cause the cores to be switched from their second to their first state, a second winding on each core, means for passing a current through any selected one of said second windings while said valve is conducting which current has a magnitude less than but equal to at least half of that which will cause the core to be switched from its second to its first state, and an output circuit responsive to current flowing through said anode-cathode discharge path.

8. Data storage apparatus comprising at least two cores of a magnetic material which has a substantially rectangular hysteresis characteristic, each core having first and second stable states of magnetisation, means for selectively setting each core to one of its two states in dependence upon the nature of a data element to be stored thereon, a first winding on each core, a valve having a control electrode and an anode and a cathode defining an anode-cathode discharge path, a pair of direct current voltage supply terminals, means connecting the anode-cathode discharge path of said valve in series with all said first windings across said supply terminals, means for maintaining the valve normally non-conducting, interrogating means separately associated with each core for switching it from its first to its second state, if it is in its first state, means responsive to the switching of any core from its first to its second state to generate a signal, means coupling said signal generating means to said control electrode to apply said signal thereto to render the valve conducting, the current which flows through said anode-cathode discharge path and said first windings in series, when the valve conducts, having a magnitude less than but equal to at least half of that which will cause the cores to be switched from their second to their first state, a second winding on each core, means for passing a current through any selected one of said second windings while said valve is conducting which current has a magnitude less than but equal to at least half of that which will cause the core to be switched from its second to its first state, and an output circuit responsive to current flowing through said anode-cathode discharge path.

9. Data storage apparatus according to claim 8 in which said setting means comprises switching means connected in parallel with the anode-cathode discharge path of said valve, means for operating said switching means to connect said first windings in series across said voltage supply terminals and means for simultaneously passing a current through the second winding of any core which is required to store a data item represented by the core being in its first state, the latter current having a magnitude less than but equal to at least half of that which will cause the core to be switched from its second to its first state.

10. Data storage apparatus according to claim 8 in which said means for switching each core from its first to its second state comprises a third winding on each core and means for passing a sufficient current through said third winding in the required sense.

11. Data storage apparatus comprising at least two cores of a magnetic material which has a substantially rectangular hysteresis characteristic, each core having first and second stable states of magnetisation, a first winding on each core, a valve having a control electrode and an anode and a cathode defining an anode-cathode discharge path, a pair of direct current voltage supply terminals, means connecting all said first windings, a resistor and said anode-cathode discharge path in series in that order between the positive and the negative ones of said supply terminals, means for biasing the valve to be normally non-conducting, means separately associated with each core for switching it from its first to its second state, a capacitor coupling the common terminals of the resistor and the adjacent one of the first windings to the control electrode circuit of said valve to apply a pulse thereto to render the valve conducting on switching of any core from its first to its second state, the current which flows through said anode-cathode discharge path and said first windings in series, when the valve conducts, having a magnitude less than but equal to at least half of that which will cause the cores to be switched from their second to their first state, a second winding on each core, means for passing a current through any selected one of said second windings while said valve is conducting which current has a magnitude less than but equal to at least half of that which will cause the core to be switched from its second to its first state, and an output circuit responsive to current flowing through said anode-cathode discharge path.

12. Data storage apparatus comprising at least two cores of a magnetic material which has a substantially rectangular hysteresis characteristic, each core having first and second stable states of magnetisation, means for selectively setting each core to one of its two states in dependence upon the nature of a data element to be stored thereon, a first winding on each core, a valve having a control electrode and an anode and a cathode defining an anode-cathode discharge path, a pair of direct current voltage supply terminals, means connecting all said first windings, a resistor and said anode-cathode discharge path in series in that order between the positive and negative ones of said supply terminals, means for biasing the value to be normally non-conducting, interrogating means separately associated with each core for switching it from its first to its second state, if it is in its first state, a capacitor coupling the common terminals of the resistor and the adjacent one of the first windings to the control electrode circuit of said valve to apply a pulse thereto to render the valve conducting on switching of any core from its first to its second state, the current which flows through said anode-cathode discharge path and said first windings in series, when the valve conducts, having a magnitude less than but equal to at least half of that which will cause the cores to be switched from their second to their first state, a second winding on each core, means for passing a current through any selected one of said second windings while said valve is conducting which current has a magnitude less than but equal to at least half of that which will cause the core to be switched from its second to its first state, and an output circuit responsive to current flowing through said anode-cathode discharge path.

13. Data storage apparatus according to claim 12 in which said setting means comprises switching means connected in parallel with the anode-cathode discharge path of said valve, means for operating said switching means to connect said first windings and said resistor in series across said voltage supply terminals and means for simultaneouly passing a current through the second winding of any core which is required to store a data item represented by the core being in its first state, the latter current having a magnitude less than but equal to at least half of that which will cause the core to be switched from its second to its first state.

14. Data storage apparatus according to claim 12 in which said means for switching each core from its first to its second state comprises a third winding on each core and means for passing a sufficient current through said third winding in the required sense.

15. Data storage apparatus according to claim 12 in which said valve is a gas-filled valve and there are further provided normally closed contacts which can be opened to break current flowing in said anode-cathode discharge path.

16. Data storage apparatus comprising at least three cores of magnetic material which has a substantially rectangular hysteresis characteristic, a first winding on each of said cores, a valve having a control electrode, all of said first windings being in series with the anode-cathode circuit of said valve, means for switching each of the cores from a first to a second state of magnetisation, a second winding on each core, means for selectively passing current through any one of said second windings, means responsive to the switching of any core from its first to its second state to generate a signal, means coupling said signal generating means to said control electrode to apply said signal thereto to render said valve conducting and thus to cause a current to flow in all said first windings, the combined flux produced by the currents flowing through said first and said second windings being sufficient to switch the related core from the second to the first state, and the flux produced by the current in either winding alone being insufficient to cause switching of the core, and an output circuit responsive to the conduction current of said valve.

17. Data storage apparatus comprising at least three cores of magnetic material which has a substantially rectangular hysteresis characteristic, a first winding on each of said cores, a valve comprising an anode, a cathode and a control electrode, all of said first windings being operatively connected in series with the anode-cathode circuit of said valve, a second winding in each of said cores, means for switching any of said cores from a first to a second state of magnetisation, means for selectively passing a current through any one of said second windings in a direction tending to switch the core from said second to said first state, means responsive to switching of any of said cores from said first to said second state to generate a signal, means coupling said signal generating means to said control electrode to apply said signal to said control electrode to cause said valve to conduct and to pass a current through said first windings in a direction tending to switch said cores from said second to said first state, alternative means for passing a current through said first windings in a direction tending to switch said cores from said second to said first state, the combined flux produced by the currents flowing through said first and second windings of a core being sufficient to switch that core from second to said first state, and the flux produced by the current flowing through one only of said windings being insufficient to cause switching of a core, and an output circuit responsive to the conduction current of said valve.

18. Data storage apparatus comprising at least three cores of a magnetic material which has a substantially rectangular hysteresis characteristic, each core having first and second stable states of magnetisation, a first winding on each core, a valve having a control electrode and an anode and a cathode defining an anode-cathode discharge path, a pair of direct current voltage supply terminals, means connecting the anode-cathode discharge path of said valve in series with all said first windings across said supply terminals, means for maintaining the valve normally non-conducting, means separately associated with each core for switching it from its first to its second state, means responsive to the switching of any core from its first to its second state to generate a signal, means coupling said signal generating means to said control electrode to apply said signal thereto to render the valve conducting, the current which flows through said anode-cathode discharge path and said first windings in series, when the valve conducts, having a magnitude less than but equal to at least half of that which will cause the cores to be switched from their second to their first state, a second winding on each core, means for passing a current through any selected one of said second windings while said valve is conducting which current has a magnitude less than but equal to at least half of that which will cause the core to be switched from its second to its first state, and an output circuit responsive to current flowing through said anode-cathode discharge path.

References Cited in the file of this patent

UNITED STATES PATENTS 2,696,600 Sorrell ---------------- Dec. 7, 1954
2,772,357 Wang ---------------- Nov. 27, 1956

OTHER REFERENCES

"A Magnetic Scaling Circuit" (Herte), Journal of Applied Physics, vol. 22, January 1951, pp. 107 to 108.